United States Patent
Volz et al.

[11] Patent Number: 5,867,341
[45] Date of Patent: Feb. 2, 1999

[54] DISC DRIVE SYSTEM USING MULTIPLE PAIRS OF EMBEDDED SERVO BURSTS

[75] Inventors: LeRoy A. Volz, Northridge; Stephen R. Manz, Canoga Park; Raymond E. Hurst, Palmdale, all of Calif.

[73] Assignee: Seagate Technology, Inc., Scotts Valley, Calif.

[21] Appl. No.: 594,114

[22] Filed: Jan. 30, 1996

[51] Int. Cl.$^6$ .................................................. G11B 5/596
[52] U.S. Cl. ................................... 360/77.08; 360/77.02
[58] Field of Search .............................. 360/77.08, 78.14, 360/77.05, 78.04, 77.02

[56] References Cited

U.S. PATENT DOCUMENTS

| | | | |
|---|---|---|---|
| 4,498,129 | 2/1985 | Velazquez | 360/77.08 X |
| 4,499,511 | 2/1985 | Sugaya | 360/78.14 |
| 4,669,004 | 5/1987 | Moon et al. | 360/77.08 X |
| 4,982,298 | 1/1991 | Volz et al. | |
| 5,117,408 | 5/1992 | Weispfenning et al. | |
| 5,185,681 | 2/1993 | Volz et al. | |
| 5,274,510 | 12/1993 | Sugita et al. | 360/77.08 X |
| 5,305,447 | 4/1994 | Hampshire | |
| 5,311,376 | 5/1994 | Joan et al. | 360/51 |
| 5,343,340 | 8/1994 | Boutaghou et al. | |
| 5,362,993 | 11/1994 | Aubry | |
| 5,381,281 | 1/1995 | Shrinkle et al. | 360/77.08 |
| 5,396,380 | 3/1995 | Shimizu et al. | 360/78.14 |
| 5,400,201 | 3/1995 | Pederson | 360/77.08 X |
| 5,455,724 | 10/1995 | Suzuki et al. | 360/77.04 |
| 5,523,902 | 6/1996 | Pederson | 368/77.08 |
| 5,600,506 | 2/1997 | Baum et al. | 360/78.14 |
| 5,602,693 | 2/1997 | Brunnett et al. | 360/77.08 |

*Primary Examiner*—Aristotelis M. Psitos
*Assistant Examiner*—James L Habermehl
*Attorney, Agent, or Firm*—Westman, Champlin & Kelly, P.A.

[57] ABSTRACT

A method and apparatus determining head position of a data transducer head relative to a selected one track of a multiplicity of concentric tracks within a magnetic/disc drive is provided. At least one prerecorded servo sector within a data track includes four time staggered servo bursts. The first pair and second pair of servo bursts are radially offset from each other by generally a burst width such that an edge from each of the pair are substantially co-linear in forming a track null. The first pair is radially offset from the second pair by one-half of the burst width. The first pair is read to determine a first relative amplitude therebetween, and the second pair is read to determine a second relative amplitude therebetween. Additionally, the radially offset and time staggered servo bursts prerecorded on the servo sector can be of varying width and numbered to create the plurality of track nulls within a data track about which the head can be positioned.

12 Claims, 10 Drawing Sheets

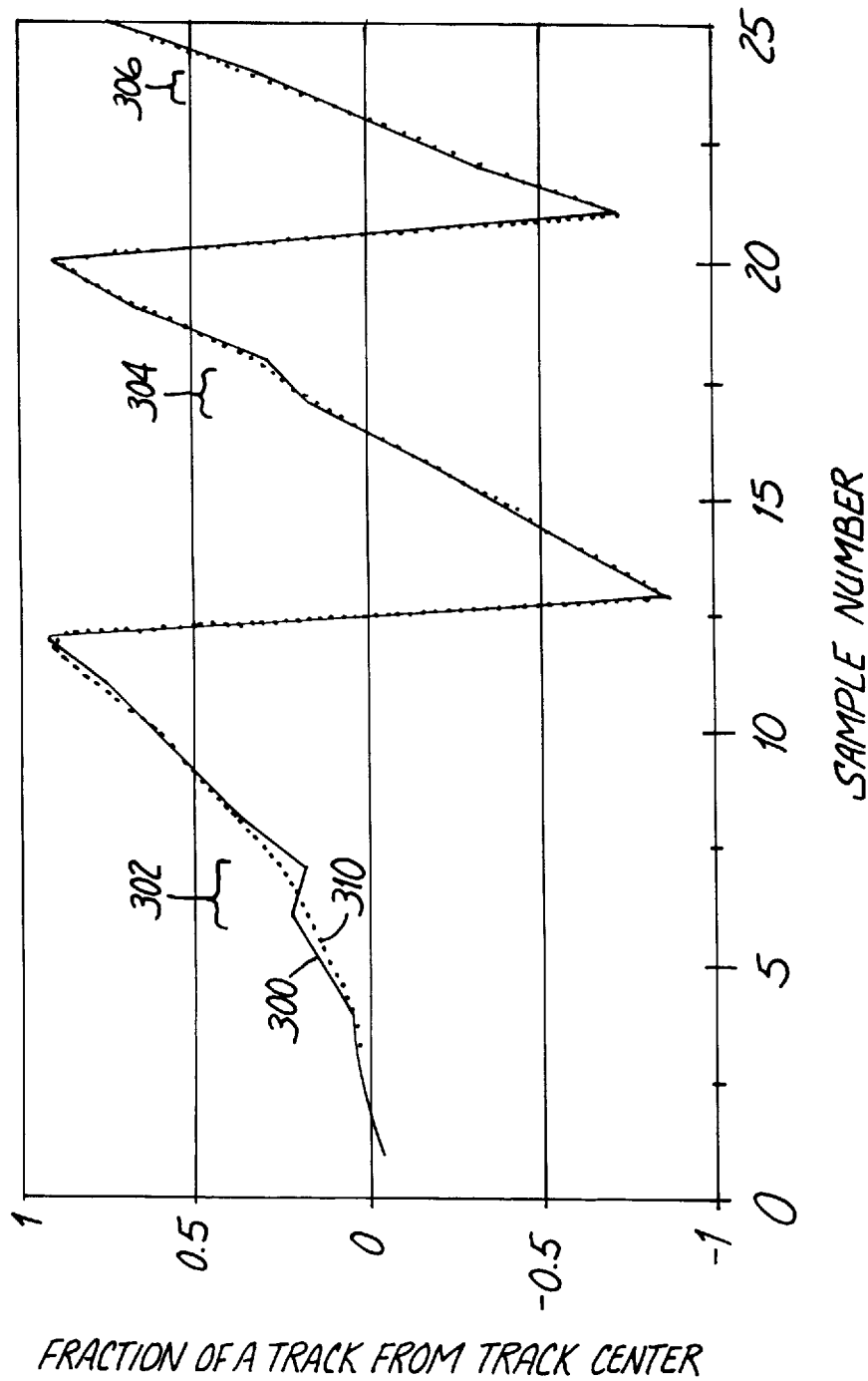

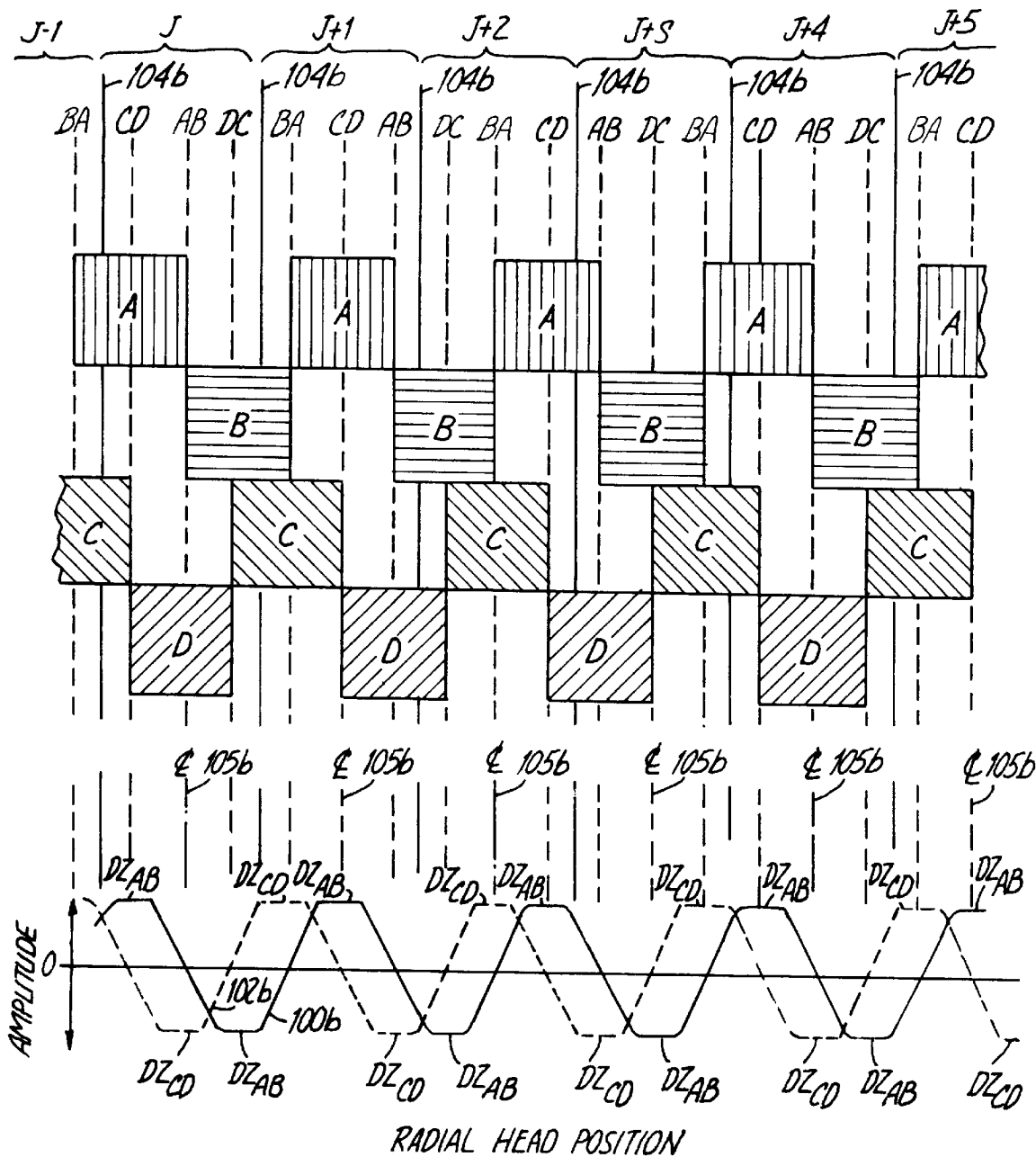

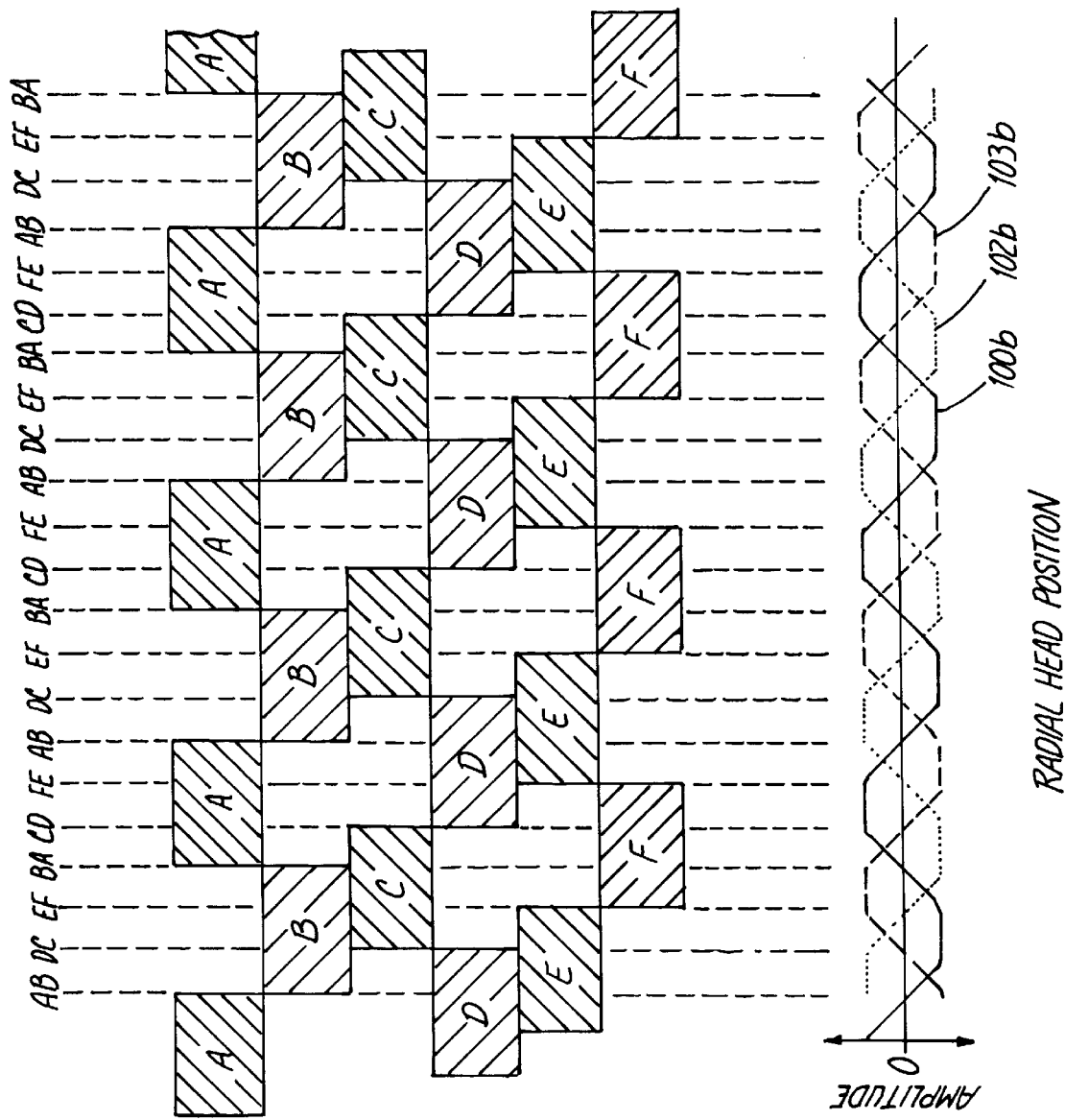

DISC DRIVE SYSTEM USING MULTIPLE PAIRS OF EMBEDDED SERVO BURSTS

BACKGROUND OF THE INVENTION

The present invention relates to head positioning control systems in magnetic disc drives. More specifically, the present invention relates to a disc drive control system using a gray code and servo bursts provided in track sectors.

Computer systems, or the like, often times employ magnetic disc drives to store information such as computer programs or data. Magnetic disc drives typically include a transducing data head mounted on a slider which "flies" over the surface of a rotating rigid magnetic disc. The transducing data head is positioned over a selected portion of the disc by a drive controller operating an actuator. The data head is used to generate magnetic fields which are impressed onto the surface of the disc during writing of information, and to sense magnetic fields from the disc surface during readback of information.

Information is typically stored in concentric tracks on the surface of the magnetic disc by providing a write signal to the data head to encode flux reversals on the surface of the magnetic disc representing the data to be stored. In retrieving data from the disc, the drive controller controls the actuator so the data head flies above the magnetic disc, sensing the flux reversals on the magnetic disc, and generating a read signal based on those flux reversals. The read signal is then decoded by the drive controller to recover data represented by flux reversals stored on the magnetic disc, and consequently represented in the read signal provided by the data head.

Accurately positioning the data head over a track on the disc is of great importance in writing data to the disc and reading data from the disc. There are typically two steps in positioning the data head over the track. The first is referred to as coarse positioning, and the second is referred to as fine positioning. During coarse positioning, the servo system positions the head over a track on the disc based upon a track address position signal received from either a drive controller controlling the disc drive, or from a host system indicating data to be accessed. The data head is typically smaller than the distance between the tracks on the disc. Therefore, fine positioning is used to appropriately position the data head within the track over which it is positioned during coarse positioning.

When the data head is not properly located within the desired track, it is said to be "off track." The further off track the data head when either writing or reading, the larger the noise to signal ratio for the operation. If the noise to signal ratio is large, the error rate would be great in reading data from the disc. Consequently, the disc drive is not able to properly write and read data.

For thin film heads, wherein writing and reading are performed by the same transducer, fine head positioning can be accomplished by using a signal retrieved from the disc when information from the disc is read. The signal indicates when the transducer is positioned at its preferred location relative to the track, or "ideal track center"; which is typically the same for reading and writing.

Magnetoresistive heads (MR heads) are commonly referred to as dual element heads. An MR head has one transducer which is used to write data to the disc, and another transducer which is used to read data from the disc, i.e. a write transducer and a read transducer. MR heads have spatial separations between the read and write transducers. Additionally, read and write transducers on a single MR head can be spatially separated from one another to a greater or lesser degree than otherwise desired, based on manufacturing tolerances. Thus, when the MR head is finally positioned over a track during a write operation, that same position is not necessarily the ideal track center for the MR head during a read operation. In other words, the ideal center for operating the read transducer is not necessarily the same as the ideal center for operating the write transducer.

One method for providing head position information is to embed servo information in a sufficient number of sectors interleaved within the tracks such that servo information may be periodically sampled and held, and head position thereupon derived from the samples. To be effective, an embedded servo pattern should include information identifying the track as unique from its neighboring tracks, and the pattern should provide a centerline reference as well. The track identification number is useful during track seeking operations to indicate the radial position of the data head transducer relative to the disc surface, and the centerline reference is useful to center the data head transducer over the ideal track centerline during track following operations. Such servo information in the prior art has included a spatial quadrature relationship which may be used to indicate the direction of movement of the transducer relative to the tracks during seeking.

It is known that a data head transducer may function as a very accurate radial position measurement device relative to recorded patterns passing by the head transducer. If the head reads a prerecorded burst pattern, the amplitude of the recovered signal will be proportional to the degree of coincidence radially between the head transducer and the burst pattern. If the head is in alignment with the burst, a maximum amplitude is recovered. If only a fraction of the burst is encountered by the head, the amplitude of the recovered signal will be a fractional amount of full amplitude which is proportional to the radial displacement of the head. If the head misses the burst completely, then no burst amplitude is recovered.

With modern servo writing techniques, embedded sector servo patterns are typically written in multiple phase coherent passes of the data transducer head so as to record servo data field and centering burst patterns which are wider than the electrical width or head gap of the data head transducer. However, a head may be aligned completely with a servo burst, but incapable of resolving relative position within a dimension by which the radial width of the burst exceeds the head width. This dimension is in effect a servo dead zone. As the head moves throughout the dead zone, the amplitude of the signal recovered from the burst will remain substantially invariant. Thus, the servo loop experiences a dead band through this range.

The prior art has attempted to accommodate the dead band by providing two or four time-staggered, radially-offset adjacent bursts having burst edges of a pair of bursts aligned with the track centerline in each servo sector. The relative amplitudes of two selected bursts having opposite edges in alignment with the centerline of the track being followed are then compared to develop a centerline offset error signal. However, this prior approach has not provided accurate position information when the head is not in precise alignment between the two radially aligned edges of the time staggered bursts. This situation becomes important during track seeking operations and most particularly during a transitional operational phase between the track seeking mode and the track following mode, a phase known as track settling.

Moreover, an MR head typically requires operation at two positions within any given track. As such, the ideal MR head position is typically not in precise alignment with the edges of the bursts. Consequently, MR heads typically operate without precise alignment information, which leads to off-track errors. Thus, there is a substantial need to provide precise alignment information to an MR head.

Another drawback of the prior art in both MR and thin film heads is that typically the amplitude variance of each burst due to offsets or other irregularities creates errors and non-linearities in the position signal. For example, errors and non-linearities impede the ability of the drive to resolve head position when moving between bursts because the position signal does not exhibit monotonicity, and can include errors in the position signal of approximately 15%. These errors and non-linearities are exacerbated as track densities continue to increase, which require more precise and accurate positioning of the transducers. Thus, there is substantial need to overcome errors and non-linearities in the positioning of the data head in order to facilitate the increased track densities.

SUMMARY OF THE INVENTION

The present invention is directed to a method and apparatus for determining head position of a data transducer head relative to a selected one track of a multiplicity of concentric tracks within a magnetic disc drive, which reduces the effect of irregularities and offsets due to amplitude variance of each burst, and improves monotonicity in the position signal as the data head moves across the track. At least one prerecorded servo sector within a data track wherein the servo sector includes four time staggered servo bursts. The first and second servo bursts are radially offset from each other by generally a burst width such that an edge from each of the first and second bursts are substantially co-linear and form a first track null. The third and fourth servo bursts are radially offset from each other by at least a burst width such that an edge from each of the third and fourth bursts are substantially co-linear and form a second track null. The third and fourth bursts are radially offset from the first and second bursts by one-half of the burst width. Thereafter, the disc drive detects the presence of a sector. The first and second bursts are read to determine a first relative amplitude therebetween, and the third and fourth bursts are read to determine a second relative amplitude therebetween. Consequently, a single operation including the first relative amplitude and the second relative amplitude is used to determine position of the data transducer head.

Additionally, in one embodiment, the radially offset and time staggered servo bursts prerecorded on the servo sector can be of varying width and number to create a plurality of track nulls within a data track about which the head can be positioned. The servo bursts are arranged in a plurality of angularly adjacent burst pairs, wherein each burst within a burst pair is radially offset from the other burst by a distance generally equal to the burst width. Each burst pair is radially offset from the other burst pairs by an amount generally equal to the burst width divided by the number of burst pairs.

BRIEF DESCRIPTION OF THE DRAWINGS

FIG. 7 is a graph of measured position error as a function of time as the actuator of FIG. 1 depicting the results of a method of the prior art and of the present invention in calculating track position error.

FIG. 8C is a diagram of servo bursts in another embodiment of the present invention.

FIG. 8D is a graph of the relative amplitudes of the servo bursts of FIG. 8C.

FIG. 9A is a diagram of servo bursts in another embodiment of the present invention.

FIG. 9B is a graph of the relative amplitudes of the servo bursts of FIG. 9A.

DETAILED DESCRIPTION OF THE PREFERRED EMBODIMENTS

Figure 1:
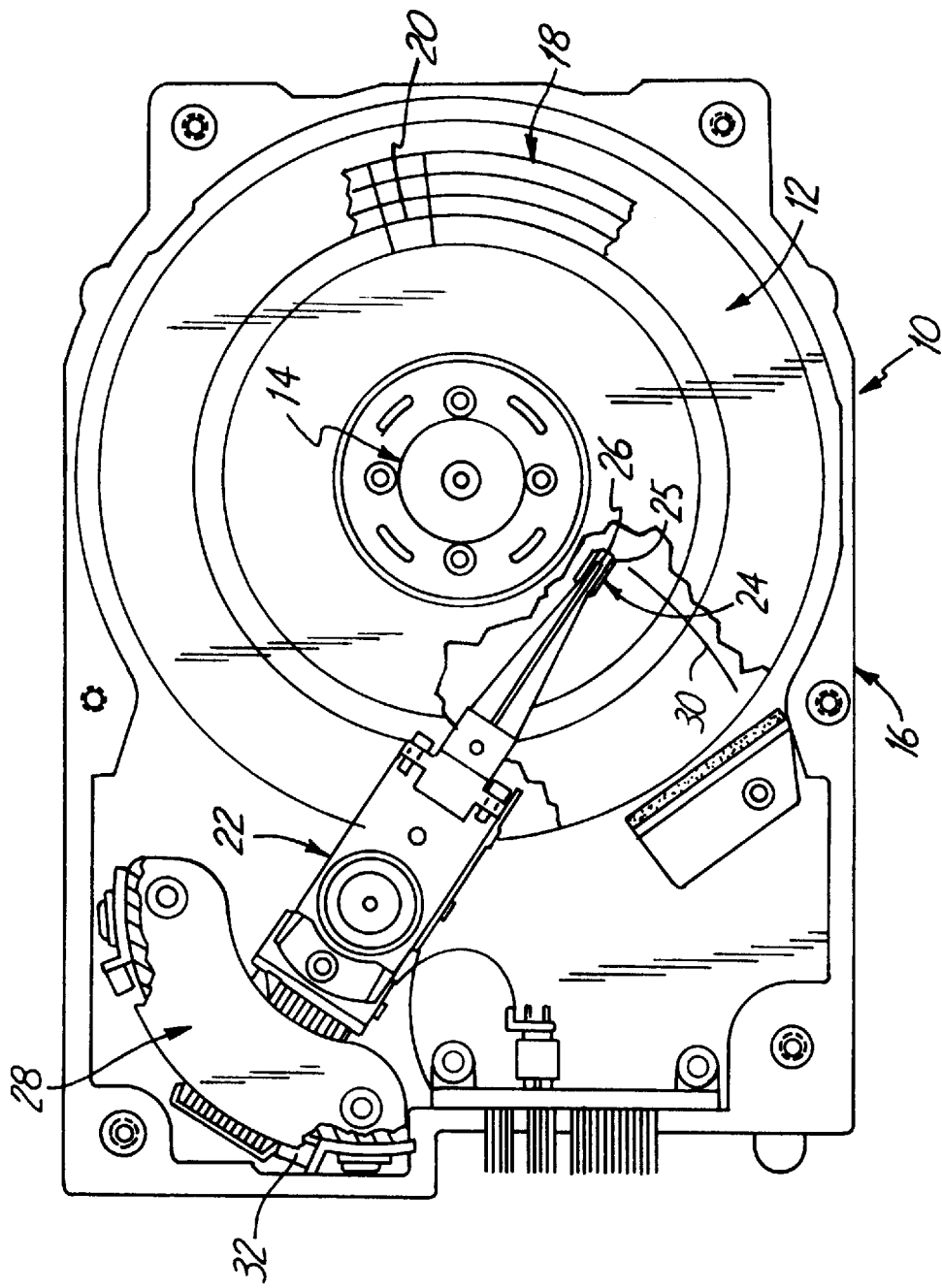
FIG. 1 is a top view of a disc drive with its upper casing removed and embodying features of the present invention.

Referring to FIG. 1, a rotary magnetic disc drive system suitable for incorporating the teachings of the present invention is shown in diagrammatic form and is referred to generally at 10. A plurality of magnetic information storage discs 12 are journaled about a spindle motor assembly 14 within a housing 16. Each magnetic disc 12 has a multiplicity of concentric circular recording tracks, indicated schematically at 18, for recording information. Each track 18 is subdivided into a plurality of sectors, indicated schematically at 20. Data can be stored on or retrieved from the discs 12 by referencing a specific track 18 and sector 20. An actuator arm assembly 22 is rotatably mounted preferably in one corner of the housing 16. The actuator arm assembly 22 carries a plurality of head gimbal assemblies 24 that each carry a slider 25 having a read/write head, or transducer 26, for reading information from and writing information onto the magnetic discs 12. Transducer 26 can include a thin film head or an MR head. A voice coil motor 28 is adapted to precisely rotate the actuator arm assembly 22 back and forth such that the transducers 26 move across the magnetic discs 12 along arc 30. The disc drive system 10 also includes control circuitry 32 for processing information to be written to or received from the discs 12 and controlling the position of the transducers 26.

Figure 2:
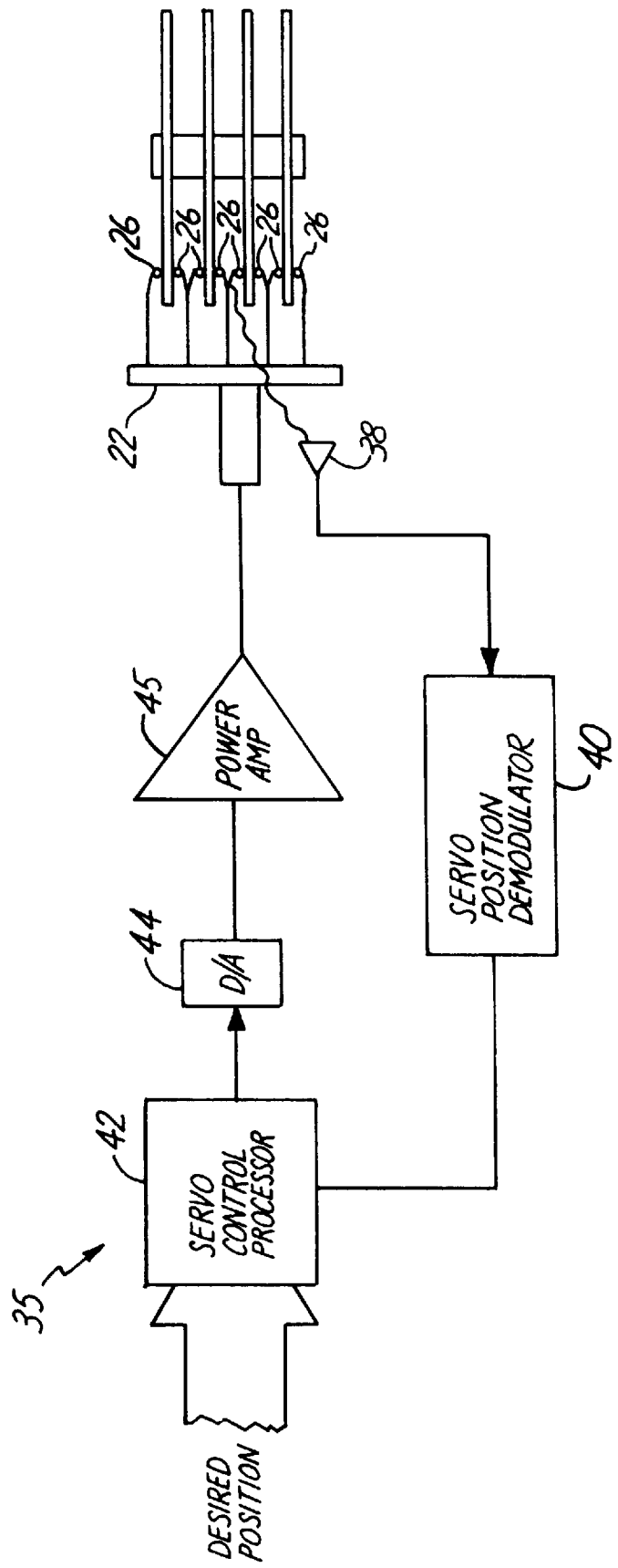
FIG. 2 is a block diagram of a portion of the disc drive of FIG. 1.

FIG. 2 is a block diagram of a negative feedback transducer positioning system, indicated generally at 35, and suitable for incorporating the teachings of the present invention, wherein the system 35 is generally included in the control circuitry 32 (shown in FIG. 1). The actuator arm assembly 22 is used to position the transducers 26 over a desired track 18 where they are held while read and write operations are performed. Transducers 26 also sample position information from the disc 12. Transducer 26 provides a position signal to a preamplifier 38, or the like, where the position signal is amplified and provided to a servo position demodulator 40 which decodes the position information and presents it, preferably in digital form, to a servo control processor 42. Servo control processor 42 compares the decoded position signal received from the demodulator with a reference position signal of the desired position to determine a transducer position error, or $X_{pe}$. The transducer position error represents the difference between the actual position of the transducer 26, indicated by the decoded position signal, and a known position indicated by the reference position signal. The servo control processor 42 can then generate a position correction signal which is converted to an analog signal by a digital-to-analog (D/A) converter 44 which is applied by amplifier 45 and applied to the actuator arm assembly 22 to move the transducers 26 along arc 30 in order to position the transducer at a desired location to minimize the transducer position error.

Figure 3:
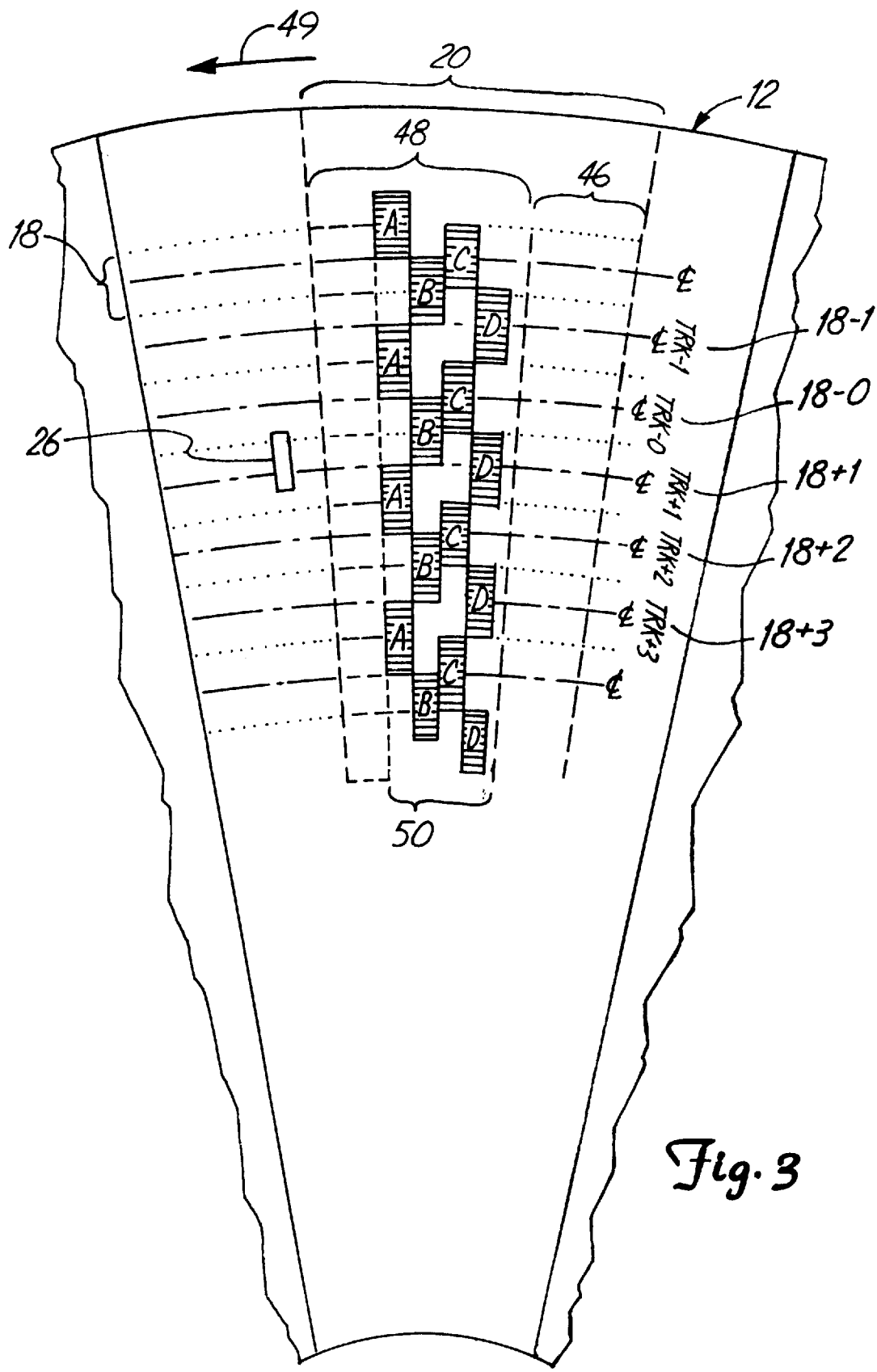
FIG. 3 is a partial schematic representation of a plurality of track sectors embodying features of the present invention.

FIG. 3 shows a partial schematic representation of disc 12. Each track 18–1 through 18+3 is subdivided into sectors 20. In one preferred embodiment, the sectors 20 include a data interval 46, and a servo interval 48 containing servo information. The servo interval 48 periodically interrupts the data interval 46 of each track 18 in order to provide position information, and the like, to the servo control processor 42. When the discs 12 are rotating (as indicated by arrow 49), sectors 20 pass by the transducer 26 wherein servo information is sampled and held for processing by the positioning system 35. The servo interval 48 is read during track seeking operations, i.e., when the transducer 26 is being moved from one track location to another track location; it is also read during track settling operations, i.e., when a destination track center line is being approached by the transducer 26; and it is read during track following operations, i.e., when the transducer 26 is following the center line of a track and is in position for reading or writing user data to and from the data intervals 46 of the track being followed. FIG. 3 also shows a burst quadrature pattern 50 as part of the servo interval 48, and described in detail below.

Figure 4:
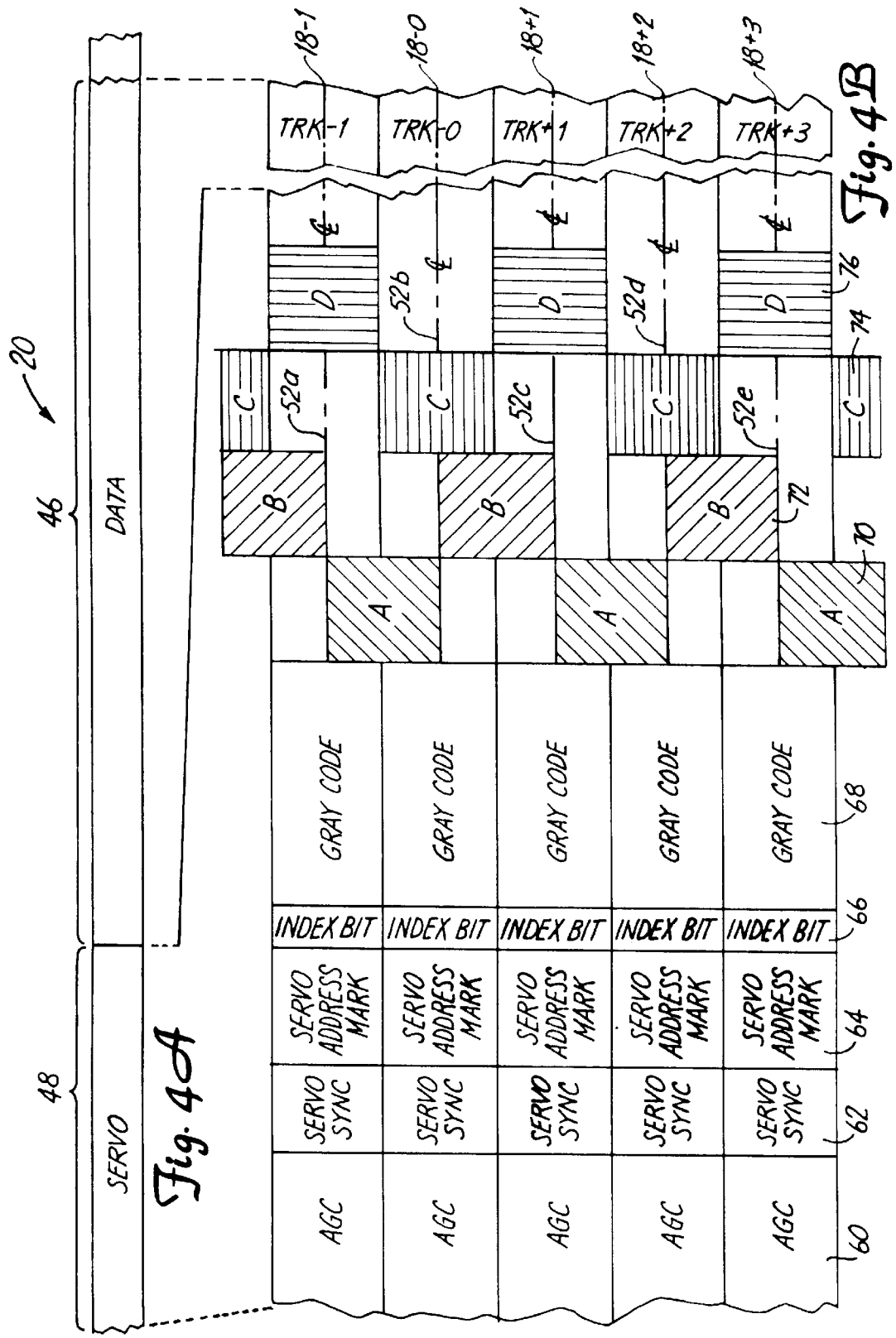
FIG. 4A is a rectilinear representation of the track sectors of FIG. 3.
FIG. 4B is a more detailed rectilinear representation of the tracks and track sectors of FIG. 4A.

Although FIG. 3 shows that each track 18 and sector 20 therein follows a circle, FIGS. 4A and 4B are rectilinear representations of a plurality of sectors on adjacent concentric tracks which will be understood by those skilled in the art. Track 18–1 lies at the radially outermost region of disc 12 of those tracks depicted in FIG. 3, track 18+3 lies at the radially innermost region of disc 12 of those tracks depicted in FIG. 3, and tracks 18–0 through 18+2 lie therebetween. Track center lines are indicated at 52a–52e, respectively.

In one embodiment, each sector servo interval 48 preferably includes an automatic gain control circuit (AGC) field 60, a servo sync field 62, a servo address mark field 64, an index bit field 66, a gray coded track number field 68, a first servo burst field 70 labeled "A" burst, a second servo burst field 72 labeled "B" burst, a third servo burst field 74 labeled "C" burst, and a fourth servo burst field 76 labeled "D" burst prerecorded thereon. The track number field 68 and the servo bursts 70–76 are used to provide absolute transducer positioning information to the transducer positioning system 35. Track number field 68 also can be used to indicate whether a track is an "odd" numbered track or an "even" numbered track. In the example of FIG. 3B, tracks 18–1, 18+1, and 18+3 are odd numbered tracks, while tracks 18–0 and 18+2 are even numbered tracks.

The relative amplitudes of bursts A–D are circumferentially off-set, or time staggered, such that burst D follows burst C, which follows burst B, which follows burst A in time. In the embodiment shown, the A and B bursts, 70 and 72, straddle track boundaries and are radially offset from each other by one track width. The A and B bursts 70, 72 make up a burst pair. The C and D bursts 74, 76 straddle track center lines, are radially offset from each other by one track, and are radially offset from the A and B bursts 70, 72 by one-half of a track. Each C burst 74 straddles an even track and each D 76 burst straddles an odd track. The C and D 74, 76 bursts make up another burst pair. Those skilled in the art will realize that other configurations are possible and contemplated.

FIG. 5A is a diagram of the servo bursts 70–76 of FIG. 4B, and FIG. 5B is a graph of the relative amplitudes of the bursts as a function of radial position of a transducer head and corresponding with FIG. 5A as indicated. Line 100 depicts the electrical amplitude waveform of the signals read from the A and B bursts in accordance with Q as a function of radial position:

$$\frac{(A-B)}{(A+B)}$$

Line 102 depicts the electrical amplitude waveform of the signals read from the C and D bursts in accordance with R as a function of radial position:

$$\frac{(C-D)}{(C+D)}$$

The denominators of Q and R function as a weighting factor to take into account any variations in burst amplitude.

It will be apparent that the radial width of the transducer 26 is less than the nominal width of each of the tracks. This arrangement conventionally provides a margin or guard band between each track to minimize cross-talk from track to track and consequent data errors. This also results in dead zones, indicated as $D-Z_{A-B}$, $D-Z_{C-D}$, for each burst pair, respectively, wherein the head is incapable of resolving its position based solely on that burst pair. The position at the edges of each burst pair labeled AB, BA, CD and DC, wherein the difference between the signals 100 or 102 read from the bursts of a burst pair is zero, is referred to as a "track null." The electrical amplitude waveform of the signals read from a burst pair in the region proximate a track null is linear and most suited for determining head position.

As the transducer 26 moves in a radial direction with respect to the tracks, i.e., at positions 26a and 26b, an amplitude value of Q and R will be obtained as lines 100 and 102. Lines 100 and 102 define fairly linear diagonal waveforms at points proximate Q=0 and R=0. The horizontal segments represent Dead Zones in which radial displacement of the transducer 26 results in no change to the respective equation. In practice, points proximate the dead zones, however, are not linear due to offsets and other irregularities. In practice, the most linear regions of lines 100 and 102 are these regions proximate 0 amplitude, i.e., regions near a track null. The generally diagonal segments mark radial position of the head in which amplitude is proportional to radial displacement. Thus, given the track number and amplitude of one of lines 100 and 102, the track position error ($X_{pe}$) can be determined. For example, as the head 26 moves away from the center line of track 18–0, radial head position point 111, toward track 18+1, burst pair A–B can be used to calculate $X_{pe}$ relative point 111. After the head moves past radial head position point 112, one-quarter track from point 111, $X_{pe}$ can be calculated with burst pair C–D as burst pair A–B approaches non-linearity and a dead zone. After radial head position point 113, three-quarters of a track from point 111, $X_{pe}$ can be calculated with burst pair A–B through radial head position point 114 as burst pair C–D is near and within a Dead Zone. This process can be continued as head 26 traverses arc 30.

Ideally, the relative amplitudes of each burst are identical. In practice, however, difficulties arise with the above method of calculating $X_{pe}$ through use of a single burst pair in part because of amplitude variance of each burst due to offsets or other irregularities. The consequence of these irregularities and offsets is exemplified at points where the calculation of $X_{pe}$ switches from employing one burst pair to employing the other burst pair, such as at points 112, 113, and 114, which are termed "commutation points." Particularly significant are points 112 and 114, i.e., one quarter track from center lines 52b and 52c, where ideally the amplitudes of Q and R are preferably equal. In practice, however, amplitudes at such points often times are disparate by about 15%. Thus, using a single burst pair to calculate $X_{pe}$ at immediately before a commutation point and then another burst pair immediately after a commutation point can provide signals to the servo control processor 42 indicating an erratic change in $X_{pe}$ when in fact there was no such change in position error. In other words, using only one pair of bursts at a time in the calculation of $X_{pe}$ does not show monotonicitiy at the commutation points, particularly near plus or minus one-quarter of a track as measured from the ideal center (indicated as track center lines 52a–52e).

A method of the present invention, described below, increases the accuracy of the $X_{pe}$ determination and provides for a more monotonic behavior of the $X_{pe}$ signal. Simply put, the present invention makes use of each servo burst pair in every $X_{pe}$ calculation. Thus, in the $X_{pe}$ calculations previously employing a single burst pair, the other burst pair is provided to account for disparate amplitudes of the bursts which increases overall accuracy of the $X_{pe}$ calculation, particularly at those regions proximate the commutation points.

Figure 6:
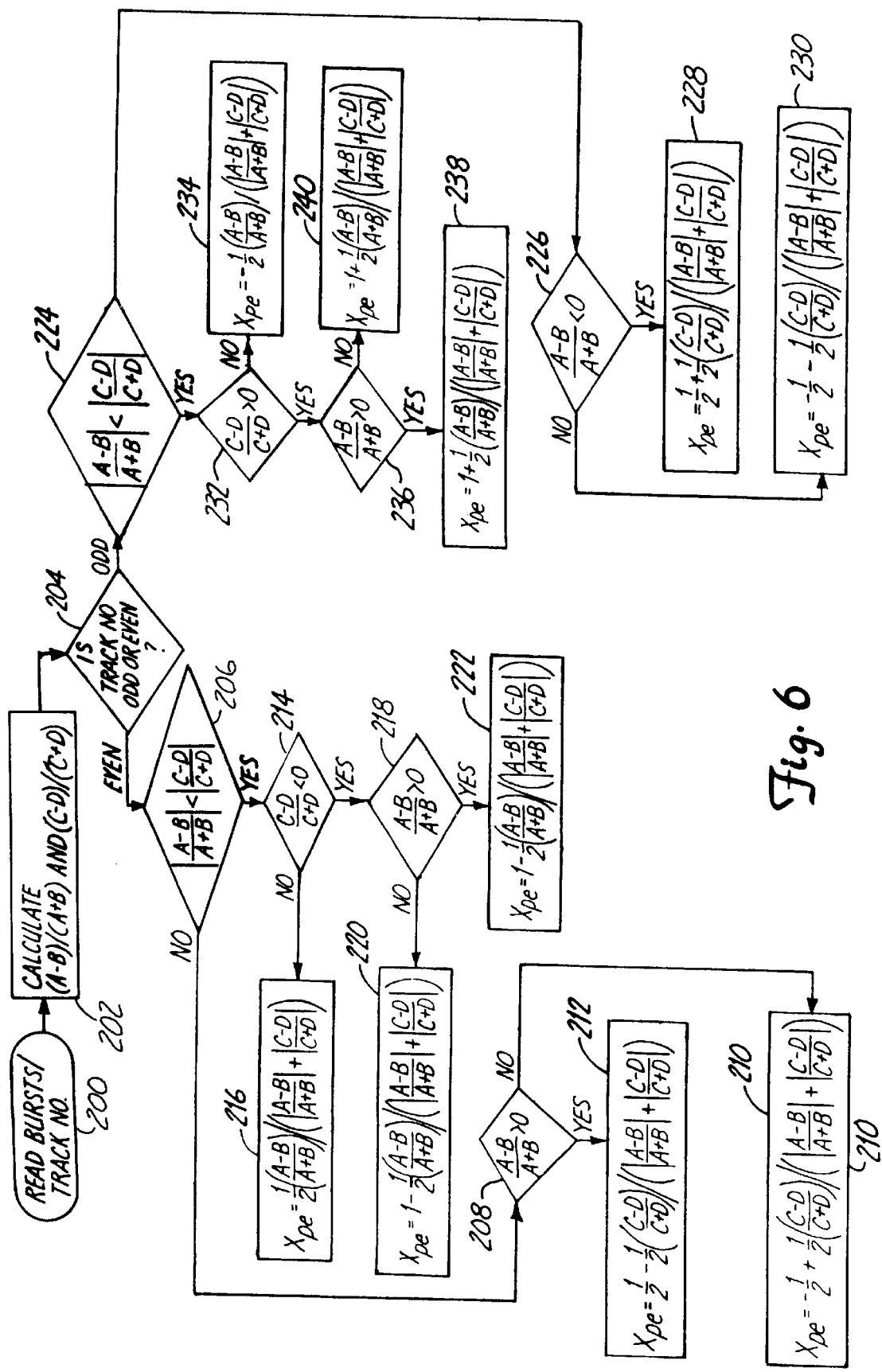
FIG. 6 is a flow chart of a method for determining track position error in accordance with the principles of the present invention.

Referring now to FIG. 6, a flow chart depicting a method embodying features of the present invention is provided. At each point where a calculation of $X_{pe}$ is desired, the amplitudes of bursts A–D and corresponding track number of the track servo interval 48 are read 200. The ratios of Q and R and their absolute values, |Q| and |R|, respectively, are then calculated 202. Calculation of $X_{pe}$ principally employs the lesser of |Q| and |R| which indicates that the head is proximate the respective track null, whereas the greater of |Q| and |R| indicates that the head is proximate the respective Dead Zone and is less likely to provide a useful result. Additionally, the track number field 68 of the desired track is obtained to indicate whether the track is either odd or even, 204. As such, based on Q, |Q|, R, |R|, and track number, $X_{pe}$ is calculated.

If the track number is even, the next step is to determine whether |Q| is less than or greater than |R|, 206. If |Q| is not less than |R|, then the next step is to determine whether Q is greater than or less than 0, 208. If Q is less than 0, $X_{pe}=\frac{1}{2}-\frac{1}{2}*(R)/(S)$, 210, wherein S=|Q|+|R|. If Q is greater than 0, $X_{pe}=\frac{1}{2}-\frac{1}{2}*(R)/(S)$, 212.

If |R| is not less than |Q|, from 206, then the next step is to determine whether R is less than or greater than 0, 214. If R is greater than 0, then $X_{pe}=\frac{1}{2}(Q)/(S)$, 216.

If R is less than 0, then the next step is to determine whether Q is less than or greater than 0, 218. If Q is less than 0, then $X_{pe}=-1-\frac{1}{2}*(Q)/(S)$, 220. If Q at step 218 is greater than 0, then $X_{pe}=1-\frac{1}{2}*(Q)/(S)$, 222.

If at step 204 the track number is odd, the next step is to determine whether |Q| is less than |R|, 224. If |Q| is greater than |R| then the next step is to determine whether Q is less than or greater than 0, 226. If Q is less than 0 then $X_{pe}=\frac{1}{2}+\frac{1}{2}*(R)/(S)$, 228. If Q is greater than 0, then $X_{pe}=-\frac{1}{2}-\frac{1}{2}*(R)/(S)$, 230.

If |Q| is less than |R| from step 224, then the next step is to determine whether R is greater than or less than 0, 232.

If R is less than 0, then $X_{pe}=-\frac{1}{2}*(Q)/(S)$, 234. If R is greater than 0 from step 232, then the next step is to determine whether Q is greater than or less than 0, 236. If Q is greater than 0, then $X_{pe}=-1+\frac{1}{2}*(Q)/S$, 238. If Q is less than 0, then $X_{pe}=1+\frac{1}{2}*(Q)/S$, 240.

Figure 5:
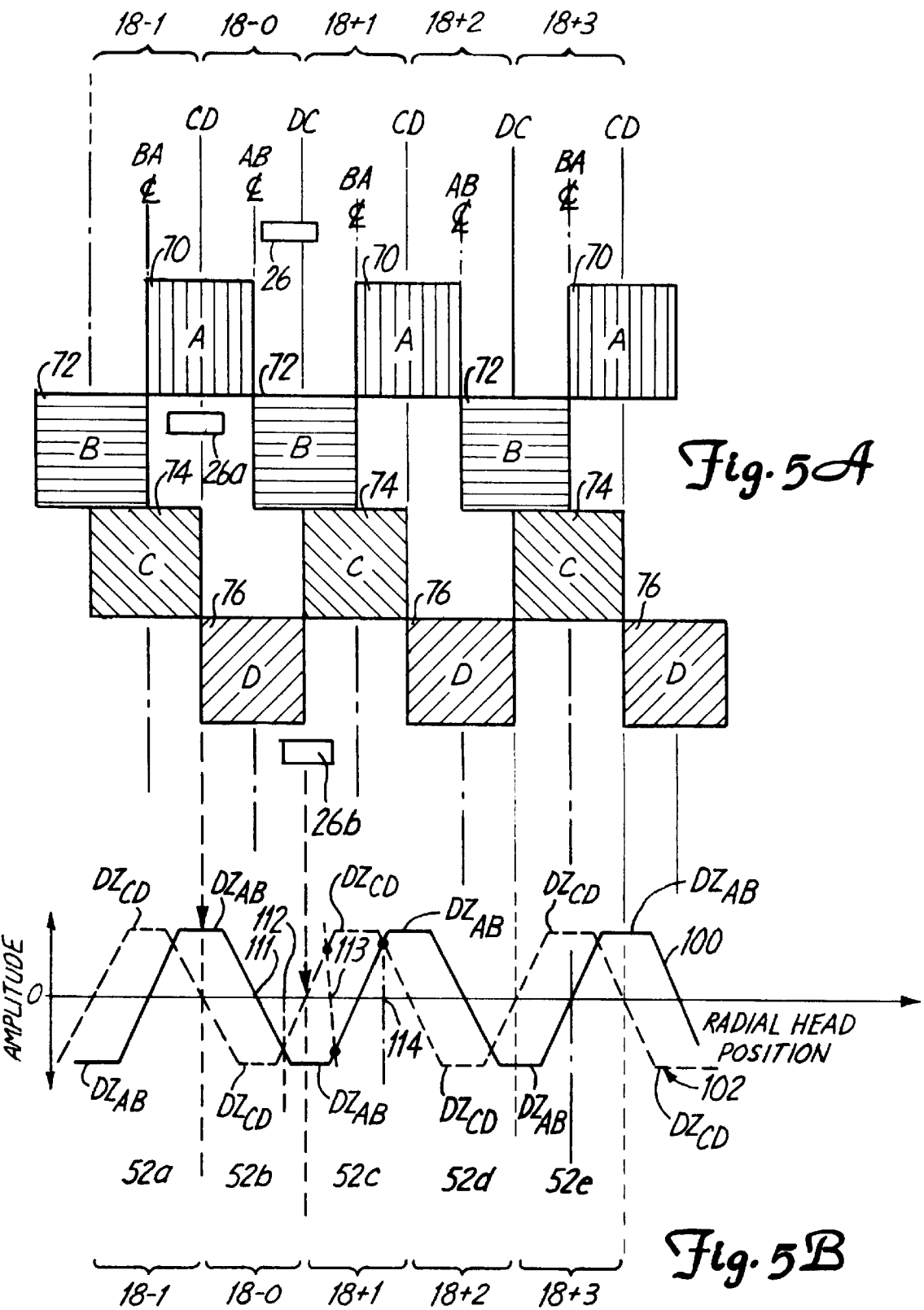
FIG. 5A is a diagram of the servo bursts of FIG. 4B.
FIG. 5B is a graph of the relative amplitudes of the servo bursts of FIG. 5A and corresponding therewith.

Those skilled in the art can recognize that a determination of $X_{pe}$ need not necessarily occur in the sequence of the steps of FIG. 5, but preferably $X_{pe}$ is calculated in the manner of Equations 1–10 as set forth below, where Equations 1 through 5 apply in cases where the track number is even, and Equations 6 through 10 apply in cases where the track number is odd:

$$\text{If}\left(\left|\frac{A-B}{A+B}\right|<\left|\frac{C-D}{C+D}\right|\right)\text{and}\left(\frac{C-D}{C+D}<0\right)\text{and} \quad \text{Equation 1}$$

$$\left(\frac{A-B}{A+B}>0\right),$$

$$X_{pe}=1.0-\frac{1}{2}\left(\frac{A-B}{A+B}\right)/\left(\left|\frac{A-B}{A+B}\right|+\left|\frac{C-D}{C+D}\right|\right)$$

$$\text{If}\left(\left|\frac{A-B}{A+B}\right|<\left|\frac{C-D}{C+D}\right|\right)\text{and}\left(\frac{C-D}{C+D}<0\right)\text{and} \quad \text{Equation 2}$$

$$\left(\frac{A-B}{A+B}<0\right),$$

$$X_{pe}=1.0-\frac{1}{2}\left(\frac{A-B}{A+B}\right)/\left(\left|\frac{A-B}{A+B}\right|+\left|\frac{C-D}{C+D}\right|\right)$$

$$\text{If}\left(\left|\frac{A-B}{A+B}\right|<\left|\frac{C-D}{C+D}\right|\right)\text{and}\left(\frac{C-D}{C+D}>0\right), \quad \text{Equation 3}$$

$$X_{pe}=\frac{1}{2}\left(\frac{A-B}{A+B}\right)/\left(\left|\frac{A-B}{A+B}\right|+\left|\frac{C-D}{C+D}\right|\right)$$

$$\text{If}\left(\left|\frac{A-B}{A+B}\right|>\left|\frac{C-D}{C+D}\right|\right)\text{and}\left(\frac{A-B}{A+B}<0\right), \quad \text{Equation 4}$$

$$X_{pe}=-\frac{1}{2}+\frac{1}{2}\left(\frac{C-D}{C+D}\right)/\left(\left|\frac{A-B}{A+B}\right|+\left|\frac{C-D}{C+D}\right|\right)$$

$$\text{If}\left(\left|\frac{A-B}{A+B}\right|>\left|\frac{C-D}{C+D}\right|\right)\text{and}\left(\frac{A-B}{A+B}>0\right), \quad \text{Equation 5}$$

$$X_{pe}=\frac{1}{2}-\frac{1}{2}\left(\frac{C-D}{C+D}\right)/\left(\left|\frac{A-B}{A+B}\right|+\left|\frac{C-D}{C+D}\right|\right)$$

$$\text{If}\left(\left|\frac{A-B}{A+B}\right|<\left|\frac{C-D}{C+D}\right|\right)\text{and}\left(\frac{C-D}{C+D}>0\right)\text{and} \quad \text{Equation 6}$$

$$\left(\frac{A-B}{A+B}>0\right),$$

$$X_{pe}=1.0+\frac{1}{2}\left(\frac{A-B}{A+B}\right)/\left(\left|\frac{A-B}{A+B}\right|+\left|\frac{C-D}{C+D}\right|\right)$$

$$\text{If}\left(\left|\frac{A-B}{A+B}\right|<\left|\frac{C-D}{C+D}\right|\right)\text{and}\left(\frac{C-D}{C+D}>0\right)\text{and} \quad \text{Equation 7}$$

$$\left(\frac{A-B}{A+B}<0\right),$$

$$X_{pe}=1.0+\frac{1}{2}\left(\frac{A-B}{A+B}\right)/\left(\left|\frac{A-B}{A+B}\right|+\left|\frac{C-D}{C+D}\right|\right)$$

$$\text{If}\left(\left|\frac{A-B}{A+B}\right|<\left|\frac{C-D}{C+D}\right|\right)\text{and}\left(\frac{C-D}{C+D}<0\right), \quad \text{Equation 8}$$

$$X_{pe}=-\frac{1}{2}\left(\frac{A-B}{A+B}\right)/\left(\left|\frac{A-B}{A+B}\right|+\left|\frac{C-D}{C+D}\right|\right)$$

-continued $$\text{If}\left(\left|\frac{A-B}{A+B}\right|>\left|\frac{C-D}{C+D}\right|\right) \text{ and } \left(\frac{A-B}{A+B}<0\right), \quad \text{Equation 9}$$

$$X_{pe} = \frac{1}{2} + \frac{1}{2}\left(\frac{C-D}{C+D}\right)\bigg/\left(\left|\frac{A-B}{A+B}\right|+\left|\frac{C-D}{C+D}\right|\right)$$

$$\text{If}\left(\left|\frac{A-B}{A+B}\right|>\left|\frac{C-D}{C+D}\right|\right) \text{ and } \left(\frac{A-B}{A+B}>0\right), \quad \text{Equation 10}$$

$$X_{pe} = -\frac{1}{2} - \frac{1}{2}\left(\frac{C-D}{C+D}\right)\bigg/\left(\left|\frac{A-B}{A+B}\right|+\left|\frac{C-D}{C+D}\right|\right)$$

As indicated by the above equations, the method of the present invention employs the operations of either Q/2S or R/2S, multiplied by either +1 or −1 and added to a constant. The appropriate operation for a given circumstance is dependent on the track type (i.e., odd or even) and the position relative to the bursts.

In order to test the method of the present invention with the prior art method of calculating position error based on using only one pair of bursts, code was written to turn off the actuator once the heads were on track thus allowing the flex circuit of the disc drive to push the actuator arm assembly slowly away from the track center line. The burst values were sampled with the transducer and $X_{pe}$ was calculated with each method. FIG. 7 is a graph of the $X_{pe}$ in terms of a fraction of a track as a function of time wherein the servo intervals were sampled every 150 microseconds. As described above, the actuator was slowly moving during the sampled period. Line 300 indicates the $X_{pe}$ when calculated using a single burst pair per operation. The prior art calculates $X_{pe}$ based on one of a single burst pair of two burst pairs. After the commutation point, the prior art calculates $X_{pe}$ based on the other burst pair. Region 302 indicates a commutation point, and the non-monotonic behavior in this region is a result of the offsets and other irregularities occurring in the burst signals which effect the $X_{pe}$ calculation. Line 310 indicates the $X_{pe}$ calculated over the same distance but with the method of the present invention. At commutations points such as regions indicated at 302, 304 and 306, line 310 exhibits significantly more monotonic behavior than graph 300 which is the result of a single operation making use of all burst signals.

In the above disclosed embodiment the track nulls AB, BA, CD & DC were provided at the center of each track and at the boundaries. Of course, the track null can be positioned anywhere within the track. The center of the track preferably dictates the placement of the track null, for thin film heads. Additionally, if the "ideal" center of the track is not at the physical track center (position of the track null), then the servo control processor can be used to adjust the head to a position offset from the track null by determining to corresponding $X_{pe}$, and maintaining the head at the $X_{pe}$.

For MR heads, the head ideal track center for operating the read transducer is often different from that when operating the write transducer. As stated above, the heads are preferably positioned proximate a track null because the $X_{pe}$ determination is most accurate when it falls within a linear region of the $X_{pe}$ calculations, i.e., those regions proximate a track null. The present invention, as described below, provides for a plurality of track nulls per track about which the read head and write head can be positioned. If a track contains two or more track nulls, additional linear regions in the $X_{pe}$ calculation within a track are provided. Thus, if one track null is proximate the ideal center for a read operation, and another track null is proximate the ideal center for a write operation, the ideal center for each can be calculated by finding the proper $X_{pe}$ for the respective operation. The accuracy of the $X_{pe}$ is enhanced by the additional track nulls. Additionally, by using more than one burst pair in the calculation of the $X_{pe}$, as described above, monotonicity of the calculation is enhanced thus providing a more accurate $X_{pe}$ determination, particularly, when the track null is not at the ideal center.

A servo burst field wherein each servo burst is N/(N+1) tracks wide, wherein N is equal to the number of burst pairs, and consequently able to provide N+1 track nulls per data track is also provided. The bursts within a burst pair are offset by N/(N+1) track widths, or a burst width. Each burst pair is offset from the other burst pair or pairs by 1/N+1 track widths. The additional track nulls provide additional linear regions in the $X_{pe}$ calculation thus enhancing accuracy.

Figure 8A:
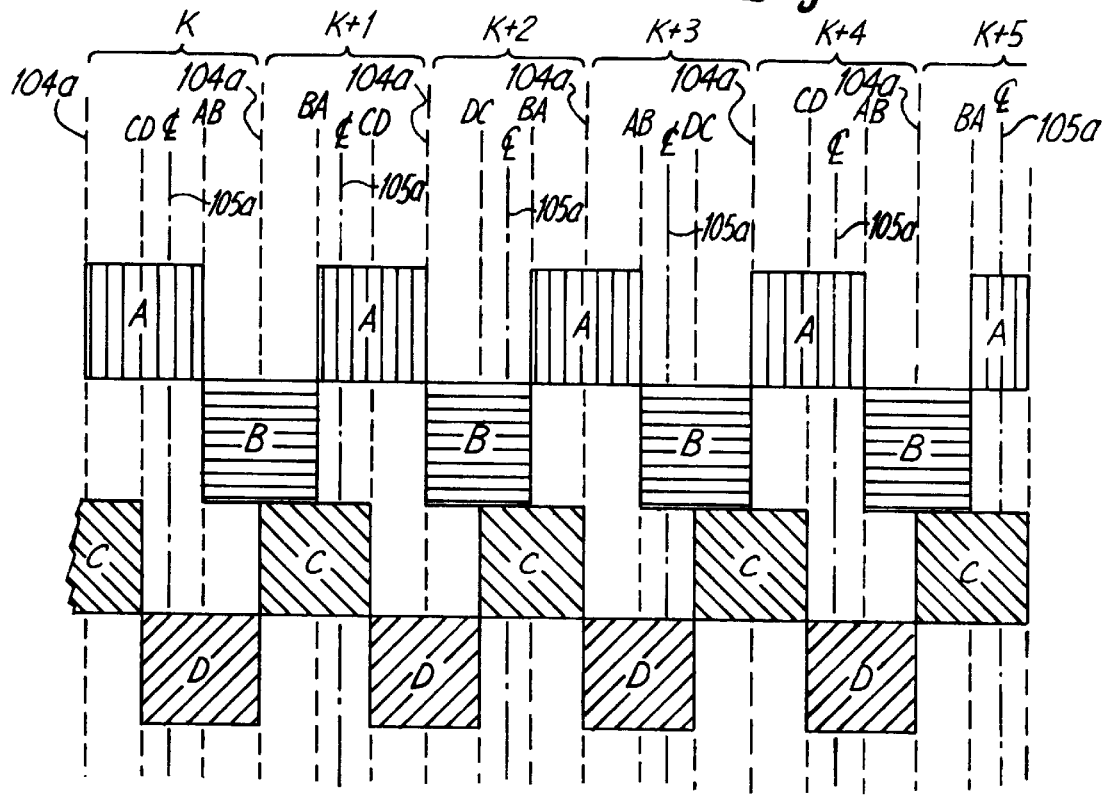
FIG. 8A is a diagram of servo bursts in another embodiment of the present invention.

FIG. 8A shows a burst field having bursts A–D 70a–76a, respectively, wherein A–B and C–D represent the two burst pairs, similar to the above-described embodiment. However, the bursts are two-thirds of a track wide, whereas the bursts in FIG. 4B and 5A are one track wide. The bursts within a burst pair are offset by ⅔ of a track from the other burst and the burst pairs are offset from each other by ⅓ of a track. In the embodiment shown in FIG. 8A the track nulls are congruent with the track boundaries and each track includes two track nulls therebetween. Transducer position error $X_{pe}$ is calculated in a similar manner as the equations described above. In other words, $X_{pe}$ is dependent on track type and nulls within the track.

The position of the track nulls based on the corresponding burst pairs are provided in the servo control processor as either prerecorded in the servo interval or as part of the executing software. For the embodiment shown in FIG. 8A, the tracks include two nulls wherein the nulls are located between a track and can be one of the four possible burst combinations: C–D and A–B in track K; B–A and C–D in track K+1; D–C and B–A in track K+2; and A–B and D–C in track K+3. Track boundaries, indicated at 104a, are congruent with track nulls and the track center lines 105a are between track nulls in this embodiment. In the embodiment shown, this pattern of burst combinations is repeated every four tracks. The track number and its corresponding track nulls are predetermined in the gray code field 68. Given the track number, it is possible to determine which of the four track null combinations is provided therein, and the positioning of the transducer based on $X_{pe}$ can be determined.

Figure 8B:
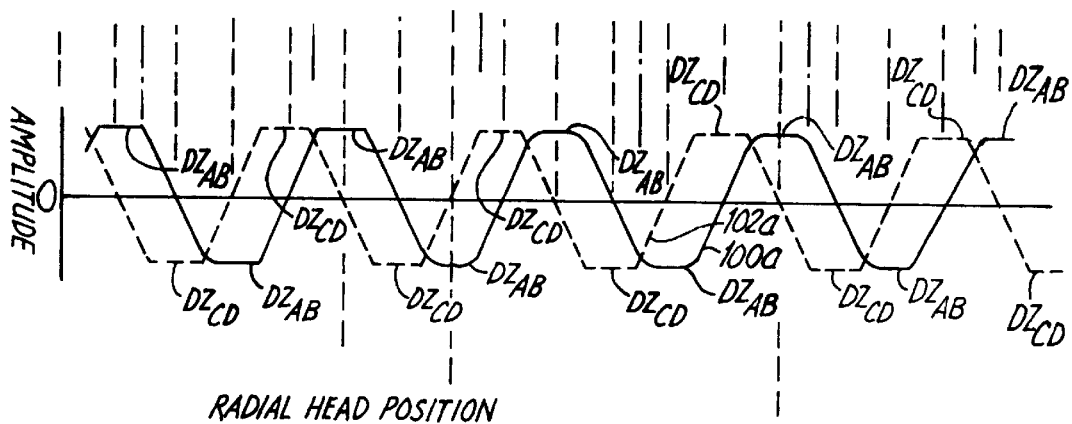
FIG. 8B is a graph of the relative amplitudes of the servo bursts of FIG. 8A.

FIG. 8B is a graph of the relative amplitudes of the bursts as a function of radial position and corresponding with FIG. 8A. Line 100a depicts the electrical amplitude waveform of the signals read from the A and B bursts in accordance with the Q as a function of radial position. Line 102a depicts the electrical amplitude waveform of the signals read from the C and D bursts in accordance with R as a function of radial position. Dead Zones D-$Z_{A-B}$ and D-$Z_{C-D}$ are indicated.

FIG. 8C is another embodiment wherein each servo burst is N/(N+1) tracks wide, wherein N is equal to the number of burst pairs, and consequently provide N+1 track nulls per data track. In this embodiment, the servo bursts are ⅔ of a track wide; there are two servo burst pairs, i.e., A–B and C–D; and there are three track nulls per data track. In this embodiment, the track boundaries 104b are between the track nulls and the track center lines 105b are congruent with a track null. In the embodiment shown, a track can include one of four possible burst combinations: CD, AB, DC in track J; BA, CD, AB in track J+1; DC, BA, CD in track J+2; and AB, DC, BA in track J+3. This pattern of burst combinations is repeated every four tracks, i.e., track J includes the same track null combinations as track J+4. Again, the track number and its corresponding track nulls are predetermined in the gray code field 68. Given the track number, it is possible to determine which of the four track null combinations is provided therein, and the positioning of the transducer based on $X_{pe}$ can be determined.

FIG. 8D is a graph of the relative amplitudes of the bursts as a function of radial position and corresponding with FIG. 8C. Line 100b depicts the electrical amplitude waveform of the signals read from the A and B bursts in accordance with Q as a function of radial position. Line 102b depicts the electrical amplitude waveform of the signals read from the C and D bursts in accordance with R as a function of radial position. Dead zones D-$Z_{a-b}$ and D-$Z_{c-d}$ are indicated.

Similarly, a servo pattern having three burst pairs produces four track nulls when each burst is three-quarters of a track wide is shown in FIG. 9A. The burst pairs are represented by A–B, C–D, and E–F. The bursts within a burst pair are offset by ¾ of a track from each other (N/N+1). The burst pairs are offset by ¼ of a track from each other (1/N+1). Track nulls are located at the colinear edges of each burst pair. Track nulls are indicated by AB, BA, CD, DC, EF and FE. In the present embodiment, each track can include three or four track nulls between the boundaries. As in the above-described embodiment, the six possible combinations of track nulls occur in sequence and are repeated every three tracks. Thus, given the track number, it is possible to determine which of the six null arrangements is provided thereto, and the positioning of the transducer based on $X_{pe}$ can be determined.

FIG. 9B is a graph of the relative amplitudes of the bursts as a function of radial position and corresponds with FIG. 9A. Line 100b depicts the electrical amplitude waveform of the signals read from the A and B bursts in accordance with Q as a function of radial position. Line 102b depicts the electrical amplitude waveform of the signals read from the C and D bursts in accordance with Equation R as a function of radial position. Line 103b depicts the electrical amplitude waveform of the signals read from the E and F bursts in accordance with T as a function of radial position:

$$\frac{(E-F)}{(E+F)}$$

Although the present invention has been described with reference to preferred embodiments, workers skilled in the art will recognize that changes may be made in form and detail without departing from the spirit and scope of the invention.

What is claimed is:

1. A method for determining head position of a data transducer head relative to a selected one track of a multiplicity of concentric data tracks each having at least one pre-recorded servo sector within a magnetic disc drive, including:

providing at least a first, second, third and fourth time staggered servo bursts having a burst width wherein the first and second servo bursts are radially offset from each other by generally a burst width such that an edge from each of the first and second bursts are substantially colinear forming a first track null, wherein the third and fourth servo bursts are radially offset from each other by at least a burst width such that an edge from each of the third and fourth bursts are substantially colinear forming a second track null and the third and fourth bursts being radially offset from the first and second bursts by one half of the burst width;

detecting the presence of a servo sector;

reading the first and second bursts to determine a first relative amplitude therebetween;

reading the third and fourth bursts to determine a second relative amplitude therebetween;

wherein the first relative amplitude comprises a first weighted difference between the first and second bursts, and wherein the second relative amplitude comprises a second weighted difference between the third and fourth bursts; and determining from an operation including the first and second relative amplitudes the position of the data transducer head.

2. The method of claim 1 wherein the bursts are time staggered such that the fourth burst follows the third burst, the third burst follows the second burst, and the second burst follows the first burst.

3. The method of claim 1 and further comprising:

determining the location of one of the first and second track nulls; and determining the position of the data transducer head relative to the one of the first and second track null.

4. The method of claim 3 wherein the data track has two track boundaries, a track center, and a track width, and wherein the width of the bursts is generally the width of the data track, wherein the first track null is substantially congruent with the track center, and the second track null is substantially congruent with one of the track boundaries.

5. The method of claim 3 wherein the data track has two track boundaries and a plurality of track nulls therebetween.

6. The method of claim 3 wherein the step of determining the location of one of the first and second track null includes determining whether the absolute value of the first relative amplitude is greater than the second relative amplitude, and whether one of the first and second relative amplitude is greater than zero.

7. The method of claim 3 wherein the step of determining the position of the data transducer includes determining an intermediate amplitude equal to one half of one of the first and second relative amplitude divided by the sum of the absolute values of the first and second relative amplitudes.

8. The method of claim 3 wherein the servo sector also includes a track identification code pre-recorded therein such that determining the location of one of the first and second track null is dependent on the track identification code.

9. A magnetic disc drive having:

an actuator arm having a transducer head;

a magnetic disc having a magnetic surface with a multiplicity of concentric data tracks thereon wherein each track includes at least one servo sector, comprising:

a first, a second, a third, and a fourth time staggered servo bursts having a burst width wherein the first and second servo bursts are radially offset from each other by generally the burst width such that an edge from each of the first and second servo bursts are generally colinear forming a first track null; and wherein the third and fourth servo bursts are radially offset from each other by generally one burst width, and from the first and second bursts by generally one-half the burst width such that an edge from each of the third and fourth bursts are substantially co-linear forming a second track null; and control circuitry operably coupled to the actuator arm for processing information on the magnetic disc wherein the servo bursts each provide a burst amplitude to be read by the transducer head and processed by the control circuitry, the control circuitry being configured to read the burst amplitudes and determine a first relative amplitude as a first weighted difference between the burst amplitudes provided by the first and second servo bursts and a second relative amplitude as a second weighted difference between the burst amplitudes provided by the third and fourth servo bursts, wherein the control circuitry positions the transducer head above the track based upon the first and second relative amplitudes.

10. The magnetic disc drive of claim 9 wherein the servo sector further includes a track identification code prerecorded therein.

11. The magnetic disc drive of claim 10 wherein each track includes two track boundaries, a track width generally equal to the radial distance between the two track boundaries, and a track center wherein the burst width is substantially equal to the track width and the first track null is substantially congruent with one of the track boundaries, and the second track null is substantially congruent with the track center.

12. The magnetic disc drive of claim 10, wherein the burst width is generally equal to two-thirds of a track width, and wherein the track boundaries are congruent with the track nulls and each track includes two track boundaries and two track nulls within the track boundaries.

* * * * *